US012181843B2

(12) United States Patent
Kitamura

(10) Patent No.: US 12,181,843 B2
(45) Date of Patent: Dec. 31, 2024

(54) ELECTRONIC APPARATUS, INFORMATION PROCESSING METHOD, AND STORAGE MEDIUM STORING INFORMATION PROCESSING PROGRAM

(71) Applicant: CASIO COMPUTER CO., LTD., Tokyo (JP)

(72) Inventor: Shigeki Kitamura, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 1077 days.

(21) Appl. No.: 16/448,217

(22) Filed: Jun. 21, 2019

(65) Prior Publication Data

US 2019/0391538 A1 Dec. 26, 2019

(30) Foreign Application Priority Data

Jun. 21, 2018 (JP) ................................ 2018-117713

(51) Int. Cl.
*G04G 9/12* (2006.01)
*G04G 19/12* (2006.01)
(Continued)

(52) U.S. Cl.
CPC ............... *G04G 19/12* (2013.01); *G04G 9/12* (2013.01); *G04G 21/04* (2013.01); *G04G 99/006* (2013.01)

(58) Field of Classification Search
CPC ........ G04B 21/04; G04B 19/12; G04G 19/12; G04G 99/006; G04G 9/12; G04G 21/04
See application file for complete search history.

(56) References Cited

U.S. PATENT DOCUMENTS

2003/0083814 A1* 5/2003 Gronemeyer .......... G04G 19/12 701/478
2011/0148696 A1* 6/2011 Sambongi ............... G01S 19/37 342/357.25

(Continued)

FOREIGN PATENT DOCUMENTS

CN 102129080 A 7/2011
CN 103269510 A 8/2013

(Continued)

OTHER PUBLICATIONS

CNIPA; Application No. 201910542315.1, Office Action dated Aug. 5, 2020.

(Continued)

*Primary Examiner* — Sean Kayes
(74) *Attorney, Agent, or Firm* — Fitch, Even, Tabin & Flannery LLP

(57) ABSTRACT

For reducing power consumption associated with record of the positional information, an electronic apparatus comprises a positional information acquisition unit configured to acquire positional information of the electronic apparatus including time information; a memory; a clock circuit; and a processor configured to acquire first timing in a first operating state and second timing in a second operating state which differs from the first operating state, control the positional information acquisition unit to acquire, in the first operating state, the positional information of the electronic apparatus including the time information, control the memory to store a time of day measured by the clock circuit at the first timing, and control the positional information acquisition unit to acquire, in the second operating state, positional information of the electronic apparatus at the second timing.

5 Claims, 6 Drawing Sheets

(51) Int. Cl.
*G04G 21/04* (2013.01)
*G04G 99/00* (2010.01)

(56) References Cited

U.S. PATENT DOCUMENTS

| | | | | |
|---|---|---|---|---|
| 2013/0244686 | A1* | 9/2013 | Saha | G06F 1/3293 455/456.1 |
| 2016/0172007 | A1* | 6/2016 | Bando | H04N 1/00896 348/231.5 |
| 2017/0075314 | A1* | 3/2017 | Perez-Feliciano | G04B 19/06 |
| 2017/0329477 | A1* | 11/2017 | Sachidanandam | G06F 3/0484 |

FOREIGN PATENT DOCUMENTS

| | | | |
|---|---|---|---|
| JP | 2001-094916 | A | 4/2001 |
| JP | 2002-32375 | A | 1/2002 |
| JP | 2004077147 | A | 3/2004 |
| JP | 2008-131301 | A | 6/2008 |
| JP | 2013-134066 | A | 7/2013 |

OTHER PUBLICATIONS

JPO; Application No. 2018-117713; Notice of Reasons for Refusal dated Apr. 12, 2022.

JPO; Application No. 2018-117713; Notice of Reasons for Refusal dated Oct. 4, 2022.

* cited by examiner

ELECTRONIC APPARATUS, INFORMATION PROCESSING METHOD, AND STORAGE MEDIUM STORING INFORMATION PROCESSING PROGRAM

This application is based on and claims the benefit of priority from Japanese Patent Application No. 2018-117713, filed on 21 Jun. 2018, the content of which is incorporated herein by reference.

BACKGROUND

Technical Field

The technical field relates to an electronic apparatus, an information processing method, and a storage medium storing an information processing program.

Related Art

Conventionally, products and services using positional information have been provided in the field of electronic devices such as cellular phones, smartphones, and navigation terminals. For example, as disclosed in Japanese Unexamined Patent Application, Publication No. 2013-134066, a technique is disclosed in which positional information is acquired at predetermined timings by a receiver using GPS (Global Positioning System), and thereafter, the acquired positional information and date and time information acquired from a clock circuit unit included in a terminal are recorded to be associated with each other.

However, the association of the positional information with the date and time information acquired from the clock circuit unit is performed each time the positional information is acquired in order to record the positional information. Therefore, such an operation causes an increase in power consumption.

SUMMARY

An embodiment of the present application relates to an electronic apparatus, an information processing method, and a storage medium storing an information processing program.

In order to solve the abovementioned problem, an electronic apparatus according to an exemplary embodiment of the present application includes:

a positional information acquisition unit configured to acquire positional information of the electronic apparatus including time information;

a memory;

a clock circuit; and a processor configured to acquire first timing in a first operating state and second timing in a second operating state which differs from the first operating state, control the positional information acquisition unit to acquire, in the first operating state, the positional information of the electronic apparatus including the time information, control the memory to store a time of day measured by the clock circuit at the first timing, and control the positional information acquisition unit to acquire, in the second operating state, positional information of the electronic apparatus at the second timing.

DETAILED DESCRIPTION

Figure 1:
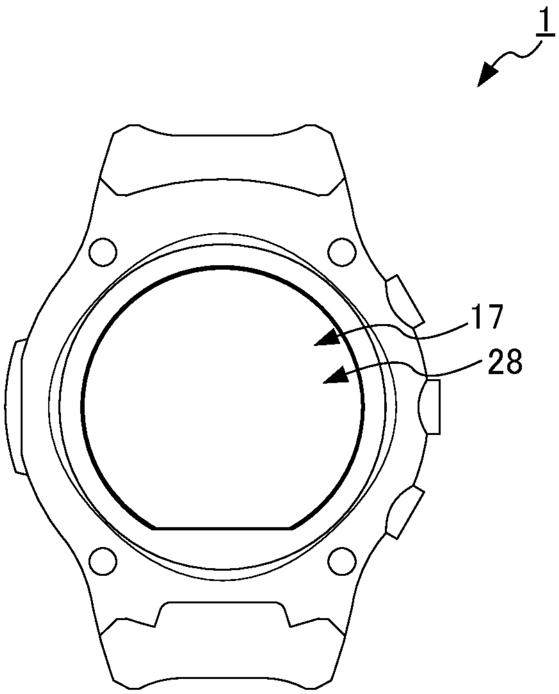
FIG. 1 is a schematic diagram illustrating an electronic apparatus according to an embodiment of the present application.

Hereinafter, embodiments will be described with reference to the drawings. FIG. 1 is a diagram illustrating an external appearance of an electronic apparatus 1 according to an embodiment of the present application. As illustrated in FIG. 1, the electronic apparatus 1 of the present embodiment is a wristwatch-type device, for example, a smart watch. The electronic apparatus 1 includes a first display 17 and a second display 28. The second display 28 is stacked on the first display 17.

The second display 28 is a transmissive display, and is able to perform display in such a manner that the display area of the first display 17 can be visually recognized. With such a configuration, the electronic apparatus 1 displays at least a part of the first display 17 in a transparent manner, thereby making it possible to perform the display of the first display 17 and the display of the second display 28 in a superimposed manner.

The electronic apparatus 1 of FIG. 1 performs marker addition processing. The marker addition processing refers to a series of processing including acquiring positional information of the electronic apparatus 1 and adding a marker indicating the acquired positional information on the map. In the marker addition processing, the electronic apparatus 1 switches between the two operating states, thereby reducing power consumption associated with recording of the positional information.

In a first operating state, when the timing of adding the marker arrives, the electronic apparatus 1 stores a time of day indicating this timing without adding the marker. Further, when the operating state transitions to a second operating state, the electronic apparatus 1 verifies (for example, checks) the time of day included in a history of the positional information with the time of day indicating the timing at which stored during the first operating state, thereby identifying the positional information corresponding to the timing of adding the marker. Thereafter, the electronic apparatus 1 adds a marker indicating the identified positional information on the map. This eliminates the need for associating the positional information with date and time information acquired from an RTC circuit 26 each time the positional information is acquired in the first operating state. This further eliminates the need for activating the function of adding the marker, displaying an operation screen for adding the marker, or the like in the first operating state.

Therefore, the electronic apparatus 1 is able to reduce power consumption associated with the recording of the positional information.

Figure 2:
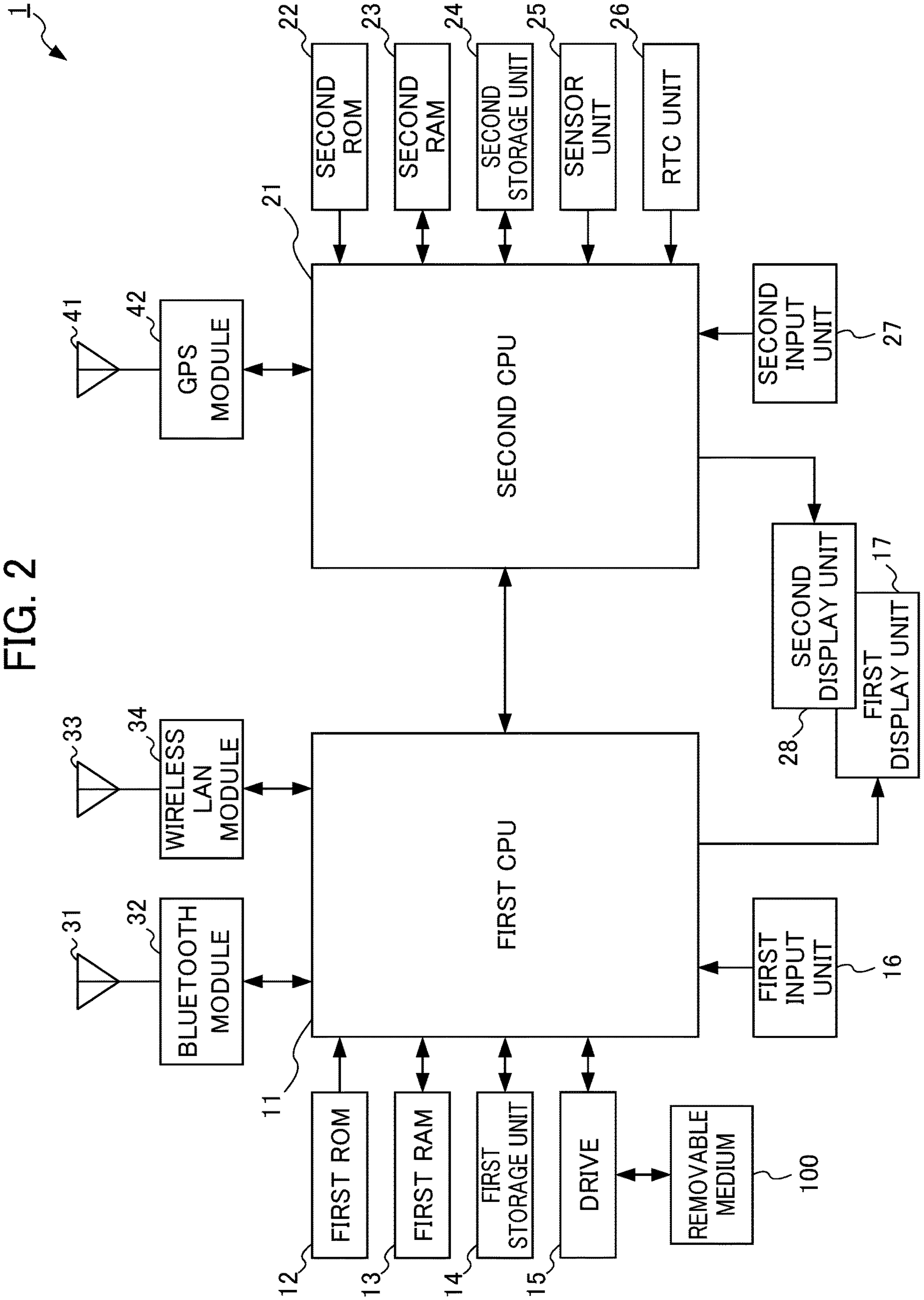
FIG. 2 is a block diagram illustrating the electronic apparatus.

FIG. 2 is a block diagram of the electronic apparatus 1. As illustrated in FIG. 2, the electronic apparatus 1 includes a first processor (Central Processing Unit) 11, first ROM (Read Only Memory) 12, first RAM (Random Access Memory) 13, a first memory 14, a drive 15, a first input unit 16, a first display 17, a second processor 21, a second ROM 22, a second RAM 23, a second memory 24, a sensor unit 25, an RTC (Real Time Clock) circuit 26, a second input unit 27, a second display 28, a Bluetooth (registered trademark) antenna 31, a Bluetooth module 32, a wireless LAN (Local Area Network) antenna 33, a wireless LAN module 34, a GPS antenna 41, and a GPS module 42.

The electronic apparatus 1 functions under the control of the first processor 11 and the second processor 21. In other words, the first processor 11 performs various kinds of arithmetic processing on the basis of the operating system (OS) and various programs executed under the control of the OS. Thereafter, the first processor 11 executes various processing based on the result of the arithmetic processing, thereby achieving functions of the electronic apparatus 1. These functions are similar to those of a smartphone. In the abovementioned second operating state, the first processor 11 performs, for example, processing of adding a marker on a map in the abovementioned second operating state. The processing of adding a marker on a map is a part of the marker addition processing.

In addition, the first processor 11 transmits to the first display 17 an instruction to display messages and the like received via the Bluetooth module 32 or the WLAN module 34. Such messages relate to, for example, incoming e-mails and weather information. Further, the first processor 11 recognizes sound that is inputted through the first input unit 16. The first processor 11 further performs processing related to various functions implemented as functions similar to those of a smartphone. In the present embodiment, the first processor 11 performs arithmetic processing on the basis of a general-purpose operating system (OS) such as Android (registered trademark).

The second processor 21 performs various types of arithmetic processing on the basis of a particular program such as a built-in program. The second processor 21 further executes processing based on the result of the arithmetic processing, thereby achieving functions of the electronic apparatus 1. These functions are similar to those of a wristwatch. For example, the second processor 21 transmits an instruction for displaying on the second display 28. In addition, for example, the second processor 21 acquires detected results from various sensors and performs processing related to various functions implemented as the functions of a wristwatch. In the abovementioned first operating state, the second processor 21, for example, acquires the timing of adding the marker and performs processing of storing the time of day indicating this timing. These pieces of processing are a part of the marker addition processing.

In addition, the second processor 21 calculates the time of day on the basis of a time signal inputted from the RTC circuit 26. The second processor 21 further transmits an instruction to display the time of day, the day of week, the date, or the like to the second display 28. Further, the second processor 21 notifies the first processor 11 of the calculated time of day, day of the week, date, and the like. It should be noted that, in terms of calculating the time of day, the second processor 21 may correct the time of day on the basis of time information included in GPS information acquired from the GPS modules 42.

The processing of a particular program such as the calculation of the time of day is performed by the second processor 21. Such processing is simpler than the processing of the OS performed by the first processor 11. For this reason, the processing of a particular program has a small processing load and is executable with low power consumption. Therefore, the hardware specification required for the second processor 21 is lower than the hardware specification required for the first processor 11. Accordingly, in a case where only the functions of the wristwatch or the function for processing in the first operating state of the marker addition processing described above is required, the second processor 21 may be operated while the first processor 11 may be switched to a sleep state. This makes it possible to reduce the power consumption of the electronic apparatus 1. Here, the sleep state may refer to a state in which most of the functions of the first processor 11 are suspended. Therefore, as described above, it is possible for the electronic apparatus 1 to reduce the power consumption associated with the recording of the positional information. This also allows a time period during which the electronic apparatus 1 can be driven by a battery (not illustrated) incorporated in the electronic apparatus 1 to become longer.

The first processor 11 is able to read data from the first ROM 12. The first ROM 12 stores various programs to be executed by the first processor 11. The first ROM 12 also stores initialization data. For example, the first ROM 12 may store various programs. Such various programs include, for example, the OS program executed by the first processor 11, various programs executed under the control of the OS, and programs for achieving the functions for performing the marker addition processing.

The first processor 11 is able to read data from the first RAM 13 and is also able to write data to the first RAM 13. The first RAM 13 provides the first processor 11 with a working memory space and stores temporary working data. For example, the first RAM 13 provides a system area and a work area when the first processor 11 executes the OS or the like.

The first processor 11 is able to read data from the first memory 14 and is also able to write data to the first memory 14. The first memory 14 is nonvolatile memory and, for example, is flash memory or EEPROM (Electrically Erasable and Programmable Read Only Memory). The first memory 14 stores various data (data of various setting contents, etc.). Such various data are generated in various functions similar to those of smartphones achieved by the control in the first processor 11.

A removable medium 100 is mounted as appropriate to the drive 15. Such a removable medium 100 includes, for example, a magnetic disk, an optical disk, a magneto-optical disk, and a semiconductor memory. The first processor 11 is able to read data from the removable medium 100 and is also able to write data to the removable medium 100. The removable medium 100 is able to store various data such as data detected by various sensors.

The first input unit 16 includes various buttons, and inputs various types of information in accordance with an operation by the user. The first input unit 16 further includes a microphone for converting sound into an electric signal. The first input unit 16 outputs the signal indicating the input sound (e.g., voice commands for operation) to the first processor 11. The first display 17 may include an organic electroluminescence display (OLED), and displays various types of information on a display screen under the control of the first processor 11.

The Bluetooth antenna 31 transmits and receives electromagnetic waves based on the Bluetooth standard. The Bluetooth antenna 31 is configured by, for example, a monopole antenna. The Bluetooth antenna 31 transmits, as an electromagnetic wave, an electric signal of wireless communication inputted from the Bluetooth module 32. The Bluetooth antenna 31 also converts the received electromagnetic waves into an electric signal to thereby output the resultant electric signal to the Bluetooth module 32. The Bluetooth module 32 transmits the signal to another device via the Bluetooth antenna 31 in accordance with an instruction from the first processor 11. Further, the Bluetooth module 32 receives a signal transmitted from another device, and outputs information indicated by the received signal to the first processor 11.

The wireless LAN antenna 33 is able to receive radio waves of a frequency corresponding to wireless communication used by the wireless LAN module 34. The wireless LAN antenna 33 is configured by, for example, a loop antenna or a rod antenna. The wireless LAN antenna 33 transmits, as an electromagnetic wave, an electric signal of wireless communication inputted from the wireless LAN module 34. The wireless LAN antenna 33 also converts the received electromagnetic wave into an electric signal and outputs the resultant electric signal to the wireless LAN module 34. The wireless LAN module 34 transmits signals to another device via the wireless LAN antenna 33 in accordance with an instruction from the first processor 11. The wireless LAN module 34 also receives a signal transmitted from another device and outputs the information indicated by the received signal to the first processor 11.

The first processor 11 is able to read data from the first RAM 13 and is also able to write data to the first RAM 13. The first RAM 13 provides the first processor 11 with a working memory space and stores temporary working data. For example, the first RAM 13 provides a system area and a work area when the first processor 11 executes the OS or the like.

The second processor 21 is able to read data from the second ROM 22. The second ROM 22 stores particular programs and initialization data to be executed by the second processor 21. For example, the second ROM 22 stores an embedded program for achieving functions of a wristwatch and a program for achieving a function for performing the marker addition processing.

The second processor 21 is able to read data from the second RAM 23 and is also able to write data to the second RAM 23. The second RAM 23 provides the second processor 21 with a working memory space and stores temporary working data. For example, the second RAM 23 provides a storage area when the second processor 21 executes the embedded programs and the like.

The second processor 21 is able to read data from the second memory 24 and is also able to write data to the second memory 24. The second memory 24 is nonvolatile memory and, for example, is flash memory or EEPROM. The second memory 24 stores various data (data of various setting contents, etc.) generated in the functions of the wristwatch, etc.

The sensor unit 25 is a set of a plurality of sensors for measuring various types of information. The sensor unit 25 includes, for example, a pulse sensor, a geomagnetic sensor, an acceleration sensor, a gyro sensor, and a light sensor. The pulse sensor is mounted on the back surface of the electronic apparatus 1. The back surface of the electronic apparatus 1 herein refers to a surface facing the user's arm. The pulse sensor detects the pulse of the user who wears the electronic apparatus 1, and outputs information indicating the detected pulse to the second processor 21. The geomagnetic sensor measures the direction of the geomagnetic field, and outputs information indicating the measured direction of the geomagnetic field to the second processor 21.

The acceleration sensor measures acceleration in three axial directions of the electronic apparatus 1, and outputs information indicating the measured acceleration to the second processor 21. The gyro sensor measures angular velocities in three axial directions of the electronic apparatus 1, and outputs information indicating the measured angular velocities to the second processor 21. The light sensor is mounted, for example, at a predetermined position on the back surface of the first display 17, at a predetermined position on the bezel portion of the electronic apparatus 1, or the like. The light sensor measures the brightness (illuminance) in the display area of the electronic apparatus 1, and outputs information indicating the measured brightness to the second processor 21.

The second processor 21 outputs the information detected by the various sensors to the first processor 11 as necessary. The first processor 11 utilizes the information detected by these various sensors by functions similar to those of smartphones. For example, the first processor 11 adjusts the illuminance of the display screen of the first display 17 on the basis of the brightness detected by the light sensor.

The RTC circuit 26 measures the time of day and outputs time signals indicating the measured time of day to the second processor 21.

The secondary input unit 27 includes various buttons, and inputs various types of information in accordance with an operation by the user.

The second display 28 may include a PN (Polymer Network) liquid crystal display. The PN liquid crystal display is able to partially or entirely transmit light. The second display 28 displays various kinds of information on a display screen (here, segment display) in accordance with the control of the second processor 21.

Figure 3A:
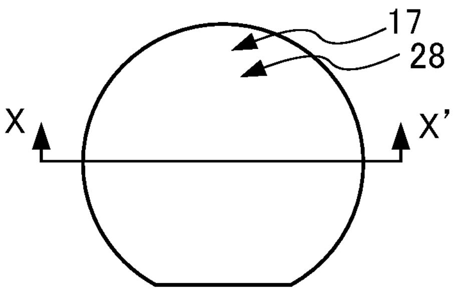
FIG. 3A is a schematic diagram illustrating a display area of the electronic apparatus.
Figure 3B:
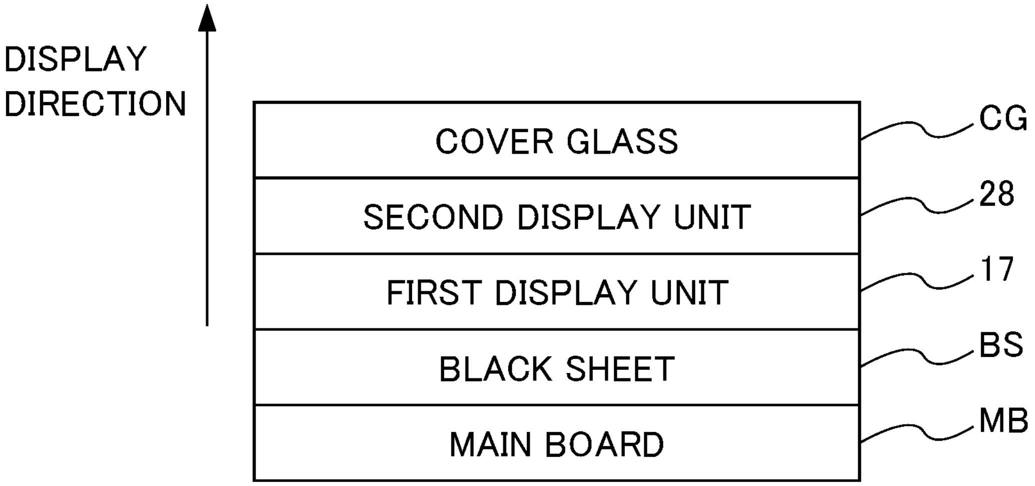
FIG. 3B is a schematic diagram illustrating a cross section taken along line X-X' in FIG. 3A.

The positional relation between the second display 28 and the first display 17 will be described with reference to FIGS. 3A and 3B. FIG. 3A is a schematic diagram illustrating an installation mode of an light sensor 29 in the display area of the electronic apparatus 1. FIG. 3B is a schematic diagram illustrating a cross section taken along line X-X' in FIG. 3A.

As illustrated in FIG. 3A, the display area of the first display 17 and the display area of the second display 28 are disposed in a superimposed manner. As illustrated in FIG. 3B, the display area of the electronic apparatus 1 has a structure in which a cover glass CG, the second display 28, the first display 17, a black sheet BS, and a main board MB are stacked in this order from the front surface. Among them, the black sheet BS is a member for adjusting color development when the black sheet BS is visually recognized through the second display 28 and the first display 17 in a transmissive manner. In the present embodiment, when the black sheet BS is visually recognized through the second display 28 and the first display 17 in a transmissive manner, black color is visually recognized. In addition, on the main board MB, the respective pieces of hardware described with reference to FIG. 2 are arranged, and signal lines for coupling the respective pieces of hardware are also arranged.

In the present embodiment, the second display 28 may be a PN liquid crystal display, and the first display 17 may be an organic EL display. In the present embodiment, the PN liquid crystal display is stacked on the display screen of the first display 17, as illustrated in FIG. 3B. As for the PN liquid crystal display, in a portion where a potential is not applied, liquid crystal molecules are arranged irregularly, and reflects light. In other words, display by the PN liquid crystal display is performed at a portion where the potential of the PN liquid crystal display is not applied.

On the other hand, in a portion where the potential of the PN liquid crystal display is applied, the liquid crystal molecules are arranged perpendicularly to the display screen, whereby light can be transmitted. In other words, in the portion where the potential of the PN liquid crystal display is applied, the light outputted from the organic EL display can be transmitted therethrough, which allows the display by the organic EL display to be visually recognized through the PN liquid crystal display. In other words, in the display area of the electronic apparatus 1, display can be performed in a state in which the display by the second display 28 is superimposed on the display by the first display 17.

As illustrated in FIG. 3B, the display directions of the first display 17 and the second display 28 are directions from the respective displays toward the cover glass. This corresponds to a direction from the back to the front of the plane of FIG. 3A.

With reference to FIG. 2 again, the GPS antenna 41 receives radio waves transmitted from a satellite, converts the radio waves into an electric signal, and outputs the converted electric signal to the GPS module 42. The GPS module 42 detects the current position (for example, current position specified by latitude, longitude and altitude) of the electronic apparatus 1 indicated by the GPS and the current time indicated by the GPS on the basis of the electric signal inputted from the GPS antenna 41. Hereinafter, the information including the current position and the current time of the electronic apparatus 1 indicated by the GPS is referred to as "GPS information". The GPS module 42 outputs the detected GPS information to the second processor 21.

Figure 4:
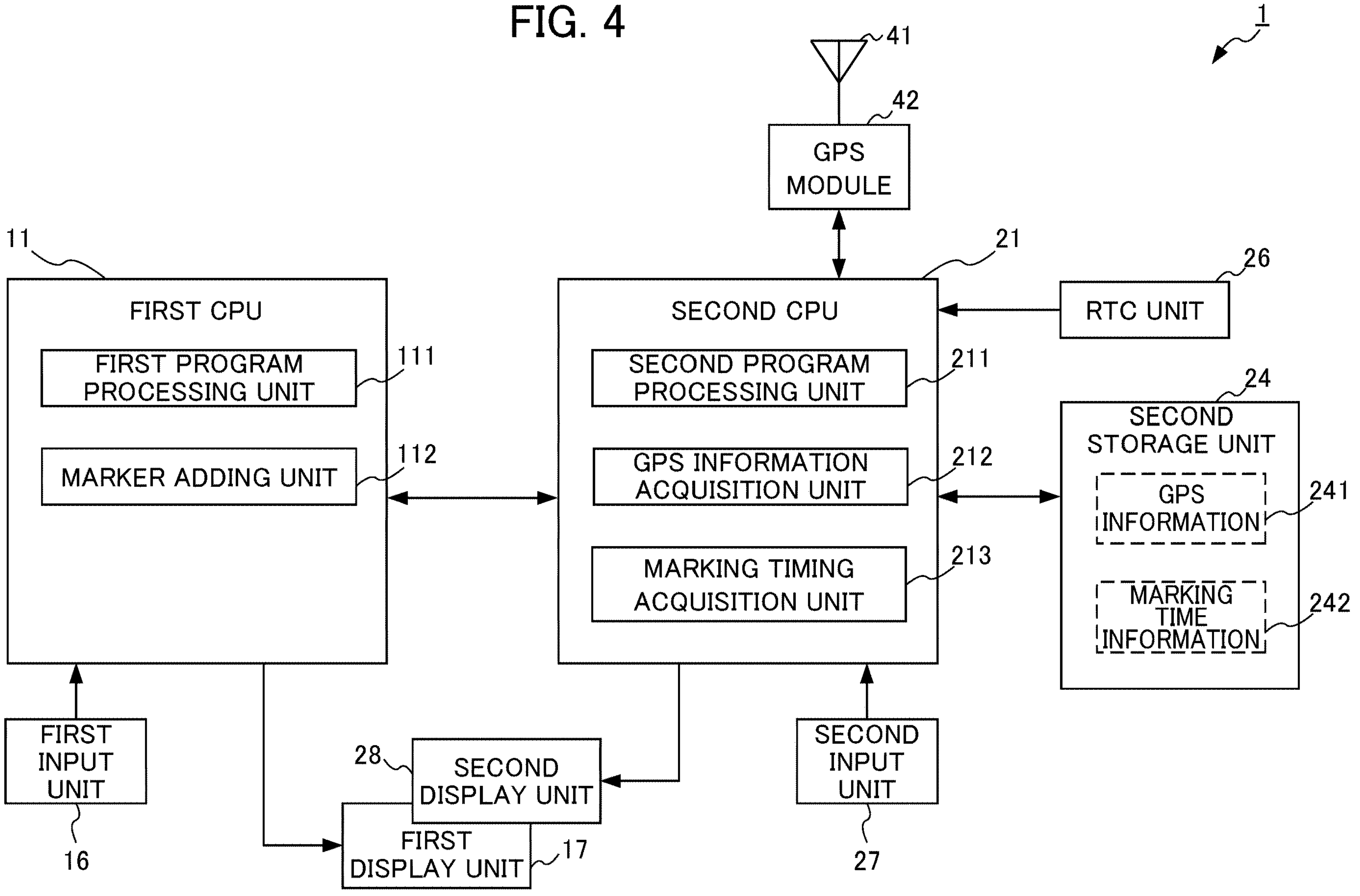
FIG. 4 is a block diagram illustrating a configuration for executing marker addition processing in a configuration of the electronic apparatus of FIG. 2.

FIG. 4 is a block diagram illustrating a configuration for executing the marker addition processing in the configuration of the electronic apparatus 1 of FIG. 2. As described above, the marker addition processing refers to a series of processing including acquiring positional information of the electronic apparatus 1 and adding a marker indicating the acquired positional information on the map.

As illustrated in FIG. 4, when the marker addition processing is executed, a first program processing unit 111 and a marker adding unit 112 function in the first processor 11. As illustrated in FIG. 4, when the marker addition processing is executed, a second program processing unit 211, a GPS information acquisition unit 212, and a timing acquisition unit 213 function in the second processor 21. In other words, in the present embodiment, the second processor 21 operates as the second program processing unit 211, the GPS information acquisition unit 212, and the timing acquisition unit 213. GPS information 241 and marking time information 242 are stored in an area of the second memory 24.

Here, as a precondition for the operation of these functional blocks, the electronic apparatus 1 operates in either of a "first operating state" and a "second operating state". In the first operating state, the second processor 21 is operated while the first processor 11 is switched to a suspended state (alternatively, a sleep state in which only some functions are left active but other functions are suspended). For example, in the first operating state, each block of the second processor 21 illustrated in FIG. 4 functions while each block of the first processor 11 illustrated in FIG. 4 does not function. The blocks of the second processor 21 include the second program processing unit 211, the GPS information acquisition unit 212, and the timing acquisition unit 213. The blocks of the first processor 11 include the first program processing unit 111 and the marker adding unit 112. In the first operating state, the first display 17 is also switched to the suspended state (alternatively, the sleep state in which only some functions are left active but other functions are suspended). Therefore, in the first operating state, it is possible for the second processor 21 to display a clock on the second display 28, which allows power consumption to be reduced in the first operating state more than in the second operating state.

Meanwhile, in the second operating state, both the second processor 21 and the first processor 11 and the first display 17 operate. Therefore, in the second operating state, both the blocks of the second processor 21 and the blocks of the first processor 11 illustrated in FIG. 4 function. Accordingly, in the second operating state, it is possible to perform, for example, processing of realizing functions similar to smartphones and processing of adding a marker on a map.

The electronic apparatus 1 performs a transition from the first operating state to the second operating state or a transition from the second operating state to the first operating state on the basis of a predetermined transition condition. The predetermined transition condition is arbitrarily set in accordance with the use of the electronic apparatus 1 or the like. For example, when the electronic apparatus 1 is powered on and activated, the electronic apparatus 1 determines that a predetermined transition condition is satisfied, and the operating state transitions to the first operating state. The electronic apparatus 1 functions as a clock and displays a clock on the second display 28.

Thereafter, when a predetermined operation is received from the user by the second input unit 27, when a predetermined time of day arrives, or when the sensor unit 25 detects a predetermined measurement value, for example, the electronic apparatus 1 determines that the predetermined transition condition is satisfied, and the operating state transitions to the second operating state. In the second operating state, the electronic apparatus 1 functions as a smart watch by realizing functions similar to those of smartphones.

Moreover, thereafter, when a predetermined operation is received from the user by the first input unit 16 or the second input unit 27, when no operation is received from the user for a predetermined period of time, or when a predetermined period of time has elapsed after entering the second operating state, for example, the electronic apparatus 1 determines that the predetermined transition condition is satisfied, and the operating state transitions to the first operating state again.

The electronic apparatus 1 continues its operation while switching between the first operating state and the second operating state in this manner. In addition, the electronic apparatus 1 realizes the marker addition processing by causing each block described below to function in each of the first operating state and the second operating state.

The first program processing unit 111 performs various types of arithmetic processing based on the first program, and controls various types of hardware on the basis of the result of the arithmetic processing, thereby achieving functions similar to smartphones. The first program is the general-purpose OS described above. The first program processing unit 111 continues the operation in the second operating state.

In the marker addition processing, the marker adding unit 112 adds a marker on the map. The marker adding unit 112 acquires, from a timing acquisition unit 213, GPS information indicating a position at which a marker is to be added. The timing acquisition unit 213 will be described later. The marker adding unit 112 acquires map information to which a marker is to be added by reading the map information from the first ROM 12, the first memory 14, the removable medium 100 mounted to the drive 15, and the like. Alternatively, the marker adding unit 112 acquires the map information from a server or the like by communication via the wireless LAN module 34 or other modules. Thereafter, the marker adding unit 112 adds a marker to the position corresponding to the GPS information acquired from the timing acquisition unit 213 on the map indicated by the acquired map information.

The map expression format or the like indicated by the map information is not limited, and may be a map of an arbitrary expression format. For example, the map may be indicated by a plane, or may be a map on which information of the altitude of a terrain, information of the environment, information of shops, facilities, and the like are added. The map is represented by image data and text data provided in advance, CG (computer graphics) generated in real time, or combinations thereof. The map may also be represented in a manner accompanied by image processing such as enlargement or reduction. Further, the marker added on the map is represented by, for example, an icon, but may be represented by other data.

The marker adding unit 112 displays, on the first display 17, the map on which the marker is added. The user can visually grasp the position at which the marker is added by referring to this display. It should be noted that a display example of the map on which the marker is added by the marker adding unit 112 will be described later with reference to FIG. 6.

The second program processing unit 211 performs various kinds of arithmetic processing based on a program which differs from the first program, and controls various kinds of hardware on the basis of the result of the arithmetic processing, thereby realizing the functions of the wristwatch. The second program is the abovementioned embedded program. The second program processing unit 211 is activated when the electronic apparatus 1 is powered on, and continues to operate regardless of the operating state.

The GPS information acquisition unit 212 acquires, from the GPS module 42, the GPS information detected by the GPS module 42. Thereafter, the GPS information acquisition unit 212 stores, as GPS information 241, the acquired GPS information in the second memory 24. The detection of the GPS information by the GPS module 42, the acquisition of the GPS information by the GPS information acquisition unit 212, and the storage of the GPS information 241 by the second memory 24 are continuously performed in both the first operating state and the second operating state at a predetermined cycle. In other words, the GPS information 241 is a history (i.e., log) of the current position of the electronic apparatus 1.

The timing acquisition unit 213 acquires predetermined timing (hereinafter referred to as "marking timing") indicating that the current position is a position at which a marker is to be added. In the following description, in particular, the marking timing in the first operating state is referred to as "first marking timing". In particular, the marking timing in the second operating state is referred to as a "second marking timing". For example, the timing acquisition unit 213 acquires the marking timing when a predetermined operation indicating the marking timing (hereinafter referred to as "marking operation") is received from the user through the second input unit 27. In the following description, in particular, the marking operation in the first operating state is referred to as a "first marking operation". In particular, the marking operation in the second operating state is referred to as a "second marking operation". In addition, the timing acquisition unit 213 acquires the marking timing when, for example, the predetermined cycle indicating the marking timing (hereinafter, referred to as "marking cycle") arrives. The length of the marking cycle is not particularly limited, and may be any length. For example, the length of the marking period may be 10 minutes. The marking timing is acquired in both the first operating state and the second operating state.

Further, the timing acquisition unit 213 acquires GPS information indicating the current position of the electronic apparatus 1 at the marking timing after acquiring the marking timing. The processing for acquiring the GPS information differs between the first operating state and the second operating state.

Specifically, when acquiring the first marking timing in the first operating state, the timing acquisition unit 213 acquires time information indicating the time of day at which the first marking timing was acquired (hereinafter referred to as "marking time information") on the basis of an input from the RTC circuit 26. Thereafter, the timing acquisition unit 213 stores the acquired marking time information in the second memory 24 as the marking time information 242.

Meanwhile, when acquiring the second marking timing in the second operating state, the timing acquisition unit 213 outputs, to the marker adding unit 112, the GPS information at the second marking timing. In the second operating state, the timing acquisition unit 213 also performs processing of matching the time of day indicated by the marking time information 242 against the time of day indicated by the GPS information 241, which are stored in the second memory 24. Thereafter, the timing acquisition unit 213 outputs the GPS information 241 indicating the time of day corresponding to the time of day indicated by the marking time information 242 (i.e., the GPS information at the time of the first marking timing) to the marker adding unit 112.

The marker adding unit 112 acquires the GPS information outputted from the timing acquisition unit 213, and adds a marker at a position on the map corresponding to the GPS information. Thus, in the present embodiment, when the marker adding unit 112 functions in the second operating state, both the marker of the first marking timing in the first operating state and the marker of the second marking timing in the second operating state are added on the map. Therefore, in the first operating state, the first processor 11 and the first display 17 are allowed to enter the suspended state or the sleep state. This makes it possible to reduce power consumption associated with the recording of the positional information.

Figure 6:
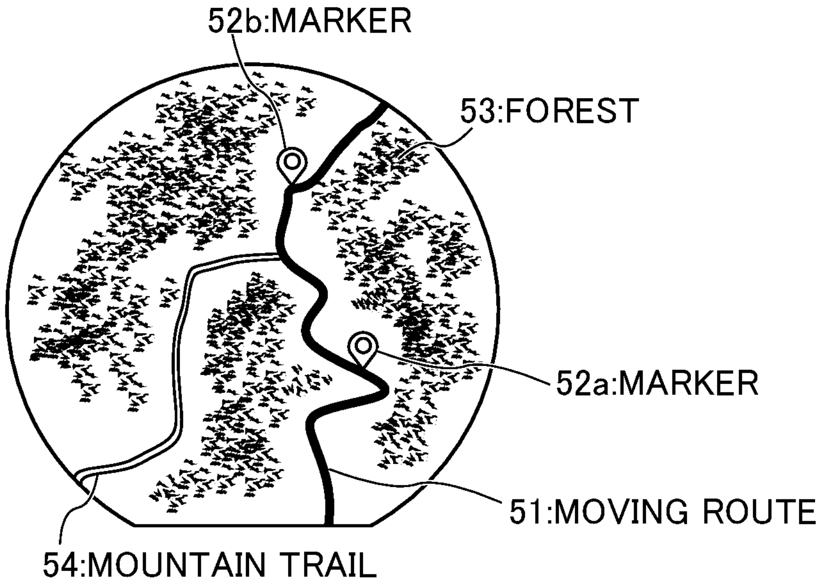
FIG. 6 is a schematic diagram illustrating an example of map display to which a marker is added by the marker addition processing.

An example of map display to which markers are added by the marker adding unit 112 and which is displayed on the first display 17 will be described with reference to FIG. 6. As illustrated in FIG. 6, the map display includes, for example, information as a map such as a forest 53 and a mountain trail 54. Thereafter, as described above, the marker adding unit 112 acquires the GPS information outputted from the timing acquisition unit 213, and adds a marker at a position on the map corresponding to the GPS information. For example, suppose that the user performs the first marking operation at a position corresponding to the marker 52*a* in FIG. 6 when the electronic apparatus 1 is in the first operating state. In this case, the timing acquisition unit 213 acquires the first marking timing, and acquires the marking time information based on the input from the RTC circuit 26.

Thereafter, the timing acquisition unit 213 stores the acquired marking time information in the second memory 24 as the marking time information 242. In other words, the timing acquisition unit 213 stores, in the second memory 24, the time information at the time when the user is at the position corresponding to the marker 52*a* in FIG. 6, as the marking time information 242. Thereafter, when the operating state of the electronic apparatus 1 transitions to the second operating state, the timing acquisition unit 213 performs the processing of matching the abovementioned times of day. Thus, the timing acquisition unit 213 acquires GPS information corresponding to the marker 52*a* in FIG. 6, and outputs the GPS information to the marker adding unit 112.

The abovementioned marker adding unit 112 acquires the GPS information outputted from the timing acquisition unit 213 in this manner, and adds a marker at a position on the map corresponding to the GPS information. This achieves the display of the marker 52*a* in FIG. 6. In addition, for example, it is assumed that a marking cycle arrives when the user moves to a position corresponding to the marker 52*b* in FIG. 6. Also in this case, the marker 52*b* in FIG. 6 is displayed in the same manner as the marker 52*a* described above. In addition, the timing acquisition unit 213 may notify of each of the pieces of the GPS information stored as the GPS information 241 to the marker adding unit 112, separately from the GPS information corresponding to the marker 52*a* or the marker 52*b*. Thereafter, the marker adding unit 112 may identify the moving route of the user on the basis of each of the pieces of GPS information, and may further display, for example, a moving route 51 in FIG. 6. By referring to such a display, it is possible for the user to visually grasp the position at which the marker is added.

Figure 5:
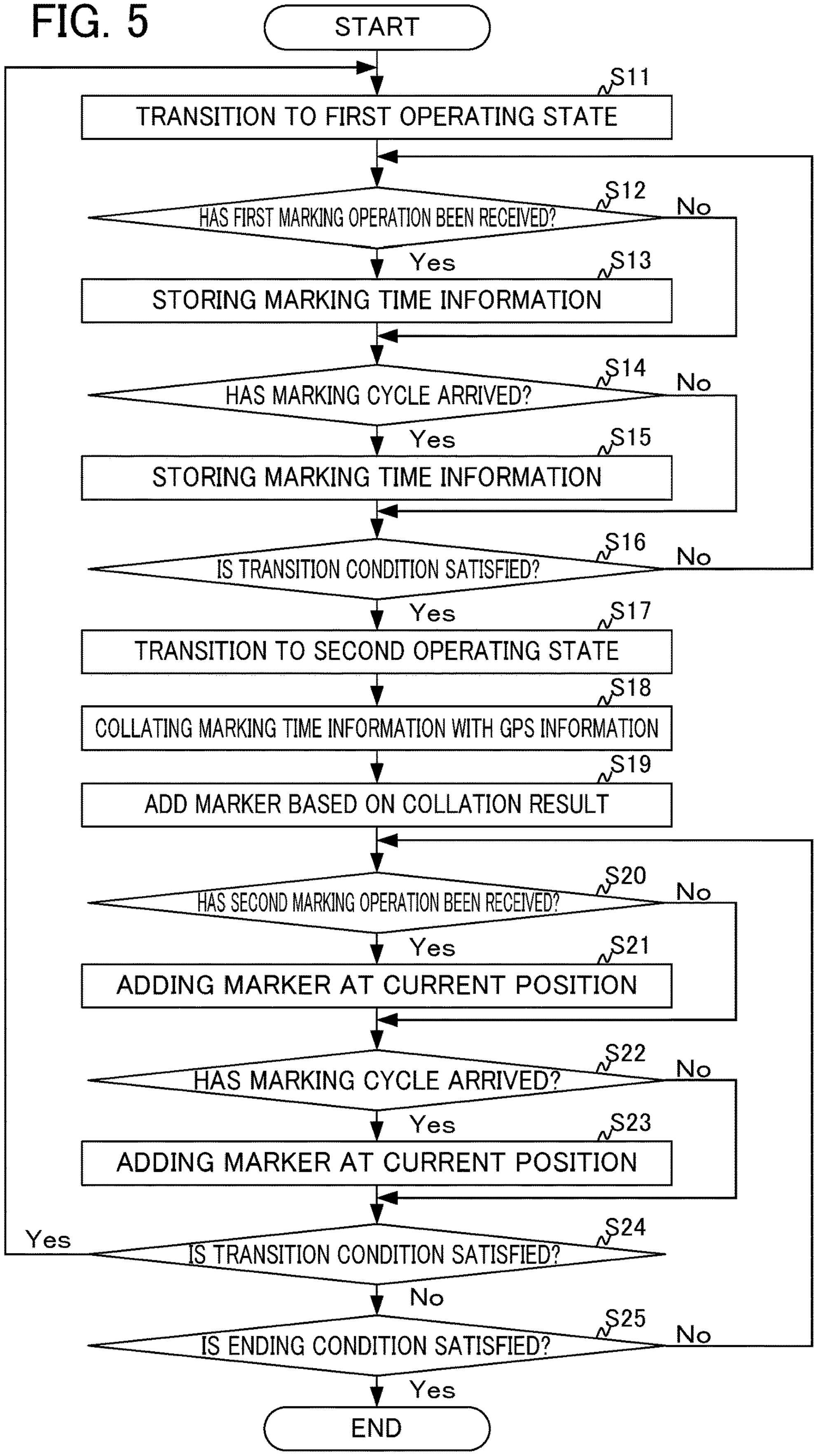
FIG. 5 is a flowchart for explaining a flow of the marker addition processing executed by the electronic apparatus of FIG. 1 including the configuration of FIG. 4.

FIG. 5 is a flowchart for explaining a flow of the marker addition processing executed by the electronic apparatus 1 of FIG. 1 having the configuration of FIG. 4. The marker addition processing is started, for example, when the electronic apparatus 1 is powered on.

In Step S11, the operating state of the electronic apparatus 1 transitions to the first operating state. In other words, the first program processing unit 111 of the first processor 11 enters the suspended state or the sleep state, and the second program processing unit 211 of the second processor 21 enters an active state and starts the operation.

In Step S12, the timing acquisition unit 213 determines whether or not the first marking operation has been received. When the first marking operation is received, it is determined as Yes by the timing acquisition unit 213 in Step S12, and the processing advances to Step S13. On the contrary, if the first marking operation has not been received, it is determined as No by the timing acquisition unit 213 in Step S12, and the processing advances to Step S14.

In Step S13, the timing acquisition unit 213 stores, in the second memory 24, the marking time information 242, which is the time information at the first marking timing. In Step S14, the timing acquisition unit 213 determines whether or not a marking cycle has arrived. When the marking cycle has arrived, it is determined as Yes by the timing acquisition unit 213 in Step S14, and the processing advances to Step S15. On the contrary, if the marking cycle has not arrived, it is determined as No by the timing acquisition unit 213 in Step S14, and the processing advances to Step S16.

In Step S15, the timing acquisition unit 213 stores, in the second memory 24, the marking time information 242, which is the time information at the first marking timing. In Step S16, the second program processing unit 211 determines whether or not a transition condition for transitioning to the second operating state is satisfied. In a case where the transition condition is satisfied, it is determined as Yes by the timing acquisition unit 213 in Step S16, and the processing advances to Step S17. In a case where the transition condition has not been satisfied, it is determined as No by the timing acquisition unit 213 in Step S16, and the processing is repeated from Step S12.

In Step S17, the operating state of the electronic apparatus 1 transitions to the second operating state. In other words, the first program processing unit 111 of the first processor 11 enters the active state and starts the operation. In addition, the second program processing unit 211 of the second processor 21 continues the operation in the active state.

In Step S18, the timing acquisition unit 213 performs processing of matching the time of day indicated by the GPS information 241 against the time of day indicated by the marking time information 242, which are stored in the second memory 24. The timing acquisition unit 213 outputs the GPS information 241 indicating the time of day corresponding to the time of day indicated by the marking time information 242 (i.e., the GPS information indicating at the time of the first marking timing) to the marker adding unit 112.

In Step S19, the marker adding unit 112 acquires the GPS information outputted from the timing acquisition unit 213 in Step S18, and adds a marker at a position on the map corresponding to the GPS information. The marker adding unit 112 displays the map on which the marker is added on the first display 17.

In Step S20, the timing acquisition unit 213 determines whether or not the second marking operation has been received. When the second marking operation is received, it is determined as Yes by the timing acquisition unit 213 in Step S20, and the timing acquisition unit 213 outputs the GPS information at the time of the second marking timing to the marker adding unit 112, and the processing advances to Step S21. On the contrary, in a case where the second marking operation has not been received, it is determined as No by the timing acquisition unit 213 in Step S20, outputting the GPS information is not performed, and the processing advances to Step S22.

In Step S21, the marker adding unit 112 acquires the GPS information outputted from the timing acquisition unit 213 in Step S20, and adds a marker at a position on the map corresponding to the GPS information. The marker adding unit 112 displays the map on which the marker is added on the first display 17.

In Step S22, the timing acquisition unit 213 determines whether or not a marking cycle has arrived. When the marking cycle has arrived, it is determined as Yes by the timing acquisition unit 213 in Step S22, the timing acquisition unit 213 outputs the GPS information at the time of the second marking timing to the marker adding unit 112, and the processing advances to Step S23. On the contrary, if the marking cycle has not arrived, it is determined as No by the timing acquisition unit 213 in Step S22, outputting the GPS information is not performed, and the processing advances to Step S24.

In Step S23, the marker adding unit 112 acquires the GPS information outputted from the timing acquisition unit 213 in Step S22, and adds a marker at a position on the map corresponding to the GPS information. Further, the marker adding unit 112 displays the map on which the marker is added on the first display 17.

In Step S24, the second program processing unit 211 determines whether or not a transition condition for transitioning to the first operating state is satisfied. In a case where the transition condition is satisfied, it is determined as Yes by the second program processing unit 211 in Step S24, and the processing returns to Step S11 again. Thereafter, in Step S11, the operating state transitions to the first operating state again. In other words, the first program processing unit 111 of the first processor 11 enters the suspended state or the sleep state, and ends the operation. In addition, the second program processing unit 211 of the second processor 21 continues the operation in the active state. On the contrary, in a case where the transition condition has not been satisfied, it is determined as No by the second program processing unit 211 in Step S24, and the processing advances to Step S25.

In Step S25, the second program processing unit 211 determines whether or not the ending condition of the marker addition processing is satisfied. Here, the ending condition of the marker addition processing can be arbitrarily determined. For example, reception of a power-off operation from the user or a condition in which the remaining amount of a battery for driving the electronic apparatus 1 is equal to or less than a predetermined amount can be used as an ending condition of the marker addition processing. If the ending condition of the marker addition processing is not satisfied, it is determined as No by the second program processing unit 211 in Step S25, and the processing returns to Step S20 again. On the contrary, in a case where the ending condition of the marker addition processing is satisfied, it is determined as Yes by the second program processing unit 211 in Step S25, and the marker addition processing ends.

In the electronic apparatus 1, the marker addition processing eliminates the need to associate the positional information with the date and time information acquired from the RTC circuit 26 in the first operating state. In addition, this also eliminates the need to activate a function of adding a marker or to display an operation screen or the like for adding the marker. Therefore, it is possible for the electronic apparatus 1 to reduce power consumption associated with recording of the positional information.

Further, the marker addition processing also makes it possible to improve the operability of the user. With the general technology, for example, even when a user adds a marker to a location which the user wants to keep simply as a sign, such as a location where the user ran out of breath while running, the user needs to perform an operation such as designating the location of the marker by referring to an operation screen for adding the marker each time. On the contrary, according to the marker addition processing in an embodiment of the present application, the user can add the marker by a simple operation such as pressing the second input unit 27 without requiring a complicated operation while referring to the screen display.

Next, a description will be given of several modification examples in which the abovementioned embodiment is modified. However, the modification examples described below are merely examples, and do not limit the modification examples to which the present embodiment can be applied.

In the abovementioned embodiment, GPS is used for positioning the position of the electronic apparatus 1; however, the present invention is not limited to this, and the position of the electronic apparatus 1 may be measured using another global positioning system. For example, the position of the electronic apparatus 1 may be measured using a global positioning system such as GLONASS or Galileo. Further, in a case where a global positioning system including the GPS is used, the positioning may be corrected by the quasi-zenith satellites system (QZSS).

The electronic apparatus 1 may further include hardware different from that of the abovementioned embodiment. For example, a touch screen may be provided on the second display 28. This makes it possible in the electronic apparatus 1 to perform the display by superimposing the display of the second display 28 on the display of the first display 17, and to perform a touch operation on the displayed content. In this case, the touch screen can be achieved by a touch screen of capacitance type, resistive film type, or the like provided on the display screen of the second display 28. The touch screen detects a touch operation position and operation contents of the user on the operation surface, generates a signal corresponding to the operation, and outputs the signal as an input signal to the first processor 11.

A plurality of types of markers may be provided for the markers added by the marker adding unit 112. For example, the marker added when the marking operation is performed and the marker added when the marking cycle arrives may be of different types. In addition, for example, different types of markers may be added in accordance with the marking operation. For example, different types of markers may be added by an operation of pressing a first button included in the second input unit 27, an operation of pressing a second button included in the second input unit 27, and an operation of long-pressing each button.

The timing acquisition unit 213 may acquire the marking timing at timings other than the timing of the marking operation or the arrival of the marking cycle. For example, the marking timing may be acquired when the user performs a predetermined operation and thereby a measured value from any of the sensors included in the sensor unit 25 exceeds a predetermined value.

In the abovementioned embodiment, the state in which the first processor 11 is in the suspended state or the sleep state, is set as the first operating state, and the state in which the first processor 11 is in the active state is set as the second operating state. The present invention is not limited to this, and the first operating state and the second operating state may be separated by other conditions. For example, when the marker adding unit 112 is not active even when the first processor 11 is active, this state may be set as the first state; whereas, when the first processor 11 is active and the marker adding unit 112 is also active, this state may be set as the second state.

In the abovementioned embodiment, the timing acquisition unit 213 matching the marking time information 242 against the GPS information 241 when the operating state enters the second operating state. The present invention is not limited to this. For example, the timing acquisition unit 213 may output all of the pieces of the GPS information 241 and the marking time information 242 to the marker adding unit 112, and the marker adding unit 112 may perform the verification.

In the abovementioned embodiment, in a case where the first marking timing is acquired in the first operating state, the timing acquisition unit 213 stores only the marking time information 242 in the second memory 24. The present invention is not limited to this. In a case where the first marking timing is acquired in the first operating state, the timing acquisition unit 213 may specify the GPS information 241 at the first marking timing and store the information in the second memory 24. This makes it possible to omit the processing of performing the verification when the operating state enters the second operating state.

In the abovementioned embodiment, as illustrated in FIG. 5, in a case where the operating state transitions to the second operating state in Step S17, the timing acquisition unit 213 performs, in Step S18, the processing of matching the time of day indicated by the marking time information 242 against the time of day indicated by the GPS information 241, which are stored in the second memory 24. In other words, the processing of matching the time of day is performed in the second operating state. However, the present invention is not limited to this, and the processing of matching the time of day may be performed at other timings. For example, in a case where there is a third operating state which differs from the second operating state, the processing of matching the time of day may be performed in the third operating state. The third operating state is, for example, a state in which the display function by the first display 17 is suspended although the first processor 11 is activated, or is a state in which the communication function by way of the Bluetooth module 32 or the WLAN module 34 is suspended. Alternatively, for example, the processing of matching may be periodically performed at a predetermined cycle in the first operating state. Even in such a case, it is possible to reduce the power consumption, as compared with a case where the processing of matching is performed each time the positional information is acquired.

The electronic apparatus 1 configured as described above includes the GPS information acquisition unit 212, the timing acquisition unit 213, the second memory 24, the RTC circuit 26, and the first processor 11 and the second processor 21. The GPS information acquisition unit 212 acquires the positional information of the electronic apparatus 1 including time information. The timing acquisition unit 213 acquires the first timing in the first operating state and the second timing in the second operating state which differs from the first operating state. The first processor 11 and the second processor 21 control the GPS information acquisition unit 212 to acquire the positional information of the electronic apparatus 1 including the time information in the first operating state; control the second memory 24 to store the time measured by the RTC circuit 26 at the first timing acquired by the timing acquisition unit 213; and control the GPS information acquisition unit 212 to acquire the positional information of the electronic apparatus 1 at the second timing acquired by the timing acquisition unit 213 in the second operating state. This eliminates the need, in the first operating state, to associate the positional information with the date and time information acquired from the RTC circuit 26 (clock circuit unit). This further eliminates the need, in the first operating state, to activate a function of adding a marker or to display an operation screen or the like for adding a marker. Therefore, according to the electronic apparatus 1, it is possible to reduce the power consumption associated with the recording of the positional information.

The second processor 21 acquires the positional information of the electronic apparatus 1 by matching the time information included in the positional information of the electronic apparatus 1 acquired by the GPS information acquisition unit 212 against the time of day measured by the RTC circuit 26 at the first timing stored by the second memory 24 in the first operating state in the operating state differing from the first operating state. This makes it possible to record the positional information when the operating state differs from the first operating state.

The electronic apparatus 1 further includes the marker adding unit 112. In the second operating state, the marker adding unit 112 adds a marker on the display of the first display 17 on the basis of the positional information of the electronic apparatus 1 acquired by the first processor 11 and the second processor 21. This makes it possible, in the second operating state, to add a marker on the basis of the acquired positional information of the electronic apparatus 1.

In the first operating state, the operating system of the electronic apparatus 1 is in an off state. In the second operating state, the operating system of the electronic apparatus 1 is in an on state. This makes it possible to reduce power consumption of the operating system in the first operating state, while this also makes it possible to execute processing required by the operating system in the second operating state.

In the first operating state, at least the first display 17 of the electronic apparatus 1 is in the off state. In the second operating state, at least the first display 17 of the electronic apparatus 1 is in the on state. This makes it possible to reduce power consumption of the first display 17 in the first operating state, while performing display required for the first display 17 in the second operating state.

The timing acquisition unit 213 acquires the first timing and the second timing on the basis of the operation of the user. This makes it possible to set the timing desired by the user to be the timing at which the marker is to be added.

It should be noted that the present invention is not limited to the above-mentioned embodiments and modification examples thereof, and that variations, modifications, and the like within a range in which the object of the present invention can be achieved are included in the present invention.

Further, in the abovementioned embodiment and modification examples thereof, the electronic apparatus 1 has been described as an example of a wristwatch-type device, such as a smart watch; however, the present invention is not particularly limited thereto. For example, the present embodiment can be applied to electronic devices in general. Specifically, for example, the present embodiment can be applied to a stationary personal computer, a notebook personal computer, a smartphone, a mobile phone, a portable game machine, a digital camera, a video camera, a portable navigation device, a multi-function device, and the like.

The processing sequence described above can be executed by hardware, and can also be executed by software. In other words, the functional configuration of FIG. 4 is merely an illustrative example, and the present invention is not particularly limited thereto. More specifically, the types of functional blocks employed to realize the above-described functions are not particularly limited to the examples shown in FIG. 4, so long as the electronic device 1 can be provided with the functions enabling the aforementioned processing sequence to be executed in its entirety. A single functional block may be configured by a single piece of hardware, a single installation of software, or a combination thereof. The functional configurations of the present embodiment are realized by a processor executing arithmetic processing. Processors that can be used for the present embodiment include a unit configured by a single unit of a variety of single processing devices such as a single processor, multi-processor, multi-core processor, etc., and a unit in which the variety of processing devices are combined with a processing circuit such as ASIC (Application Specific Integrated Circuit) or FPGA (Field-Programmable Gate Array).

In the case of having the series of processing executed by software, the program constituting this software is installed from a network or storage medium to a computer or the like.

The computer may be a computer equipped with dedicated hardware. In addition, the computer may be a computer capable of executing various functions, e.g., a general purpose personal computer, by installing various programs.

The storage medium containing such a program can not only be constituted by the removable medium 100 of FIG. 2 distributed separately from the device main body for supplying the program to a user, but also can be constituted by a storage medium or the like supplied to the user in a state incorporated in the device main body in advance. The removable medium 100 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), Blu-ray (Registered Trademark) or the like. The magnetic optical disk is composed of an MD (Mini-Disk) or the like. The storage medium supplied to the user in a state incorporated in the device main body in advance is constituted by, for example, the ROM 12 of FIG. 2 in which the program is recorded, and a hard disk included in the first memory 14 and the second memory 24 of FIG. 2, and the like.

It should be noted that, in the present specification, the steps defining the program recorded in the storage medium include not only the processing executed in a time series following this order, but also processing executed in parallel or individually, which is not necessarily executed in a time series.

The embodiments described above are only illustrative, and are not to limit the technical scope of the present invention. The present invention can assume various other embodiments. Additionally, it is possible to make various modifications thereto such as omissions or replacements within a scope not departing from the spirit of the present invention. These embodiments or modifications thereof are within the scope and the spirit of the invention described in the present specification, and within the scope of the invention recited in the claims and equivalents thereof.

What is claimed is:

1. An electronic apparatus comprising:

a positional information acquisition unit configured to acquire positional information of the electronic apparatus including time information;

a clock circuit;

a first processor configured not to be operated in a first operating state, which is a sleep suspended state or a state, while to be operated in a second operating state, which is a normal operating state, which differs from the first operating state; and, a second processor configured to be operated in the first and the second operating states and to acquire first marking timing on a basis of a user's input operation for obtaining a marker at a particular position in a period in which the first operating state continues and second marking timing on a basis of the user's input operation for obtaining a marker at a particular position in a period in which the second operating state continues, a second storage unit that is active in the first operating state and the second operating state;

a first display unit; and a second display unit which is light transmissive and stacked on the first display unit, wherein the second processor controls the positional information acquisition unit to acquire, in the first operating state, the positional information of the electronic apparatus including the time information, controls the second storage unit to store a time of day measured by the clock circuit at the first marking timing without associating the time of day with the positional information, controls the positional information acquisition unit to acquire, in the second operating state, positional information of the electronic apparatus at the second marking timing, and matches, in the second operating state, the time information included in the positional information of the electronic apparatus acquired by the positional information acquisition unit at the first marking timing against the time of day measured by the clock circuit at the first marking timing stored by the second storage unit in the first operating state, thereby acquiring positional information of the electronic apparatus at the first marking timing, and the first processor is configured to add, in the second operating state, a marker on a map displayed on the first display unit on a basis of the positional information of the electronic apparatus at the first marking timing and the second marking timing acquired by the positional information acquisition unit, wherein the first processor adds, on the map displayed on the first display unit, markers indicating the first marking timing and the second marking timing without displaying markers other than the markers indicating the first marking timing and the second marking timing.

2. The electronic apparatus according to claim 1, wherein the first display unit is in a suspended or a sleep state in the first operating state and in a display state in the second operating state, and the second display is in the display state in the first and the second operating states.

3. The electronic apparatus according to claim 1, wherein the first processor adds the markers indicating the first marking timing and the second marking timing without highlighting a moving route between the markers indicating the first marking timing and the second marking timing.

4. An information processing method executed by an electronic apparatus including a positional information acquisition unit which acquires positional information of the electronic apparatus including time information, a clock circuit, a first processor configured not to be operated in a first operating state, which is a suspended state or a sleep state, while to be operated in a second operating state, which is a normal operating state, which differs from the first operating state, and, a second processor configured to be operated in the first and the second operating states and to acquire first marking timing on a basis of a user's input operation for obtaining a marker at a particular position in a period in which the first operating state continues and second marking timing on a basis of the user's input operation for obtaining a marker at a particular position in a period in which the second operating state continues, a second storage unit that is active in the first operating state and the second operating state;

a first display unit; and a second display unit which is light transmissive and stacked on the first display unit, wherein the information processing method comprising the steps of:

controlling the positional information acquisition unit using the second processor to acquire, in the first operating state, the positional information of the electronic apparatus including the time information, controlling the second storage unit using the second processor to store a time of day measured by the clock circuit at the first marking timing without associating the time of day with the positional information, controlling the positional information acquisition unit using the second processor to acquire, in the second operating state, positional information of the electronic apparatus at the second marking timing, and matching, in the second operating state, the time information included in the positional information of the electronic apparatus acquired by the positional information acquisition unit at the first marking timing against the time of day measured by the clock circuit at the first marking timing stored by the second storage unit in the first operating state, thereby acquiring positional information of the electronic apparatus at the first marking timing, and adding, in the second operating state and using the first processor, a marker on a map displayed on the first display unit on a basis of the positional information of the electronic apparatus at the first marking timing and the second marking timing acquired by the positional information acquisition unit, wherein adding, using the first processor, the marker on the map displayed on the first display unit includes adding markers indicating the first marking timing and the second marking timing without displaying markers other than the markers indicating the first marking timing and the second marking timing.

5. A non-transitory storage medium encoded with a computer-readable information processing program that enables an electronic apparatus including a positional information acquisition unit which acquires positional information of the electronic apparatus including time information, a clock circuit, a first processor configured not to be operated in a first operating state, which is a suspended state or a sleep state, while to be operated in a second operating state, which is a normal operating state, which differs from the first operating state, and a second processor configured to be operated in the first and the second operating states and to acquire first marking timing on a basis of a user's input operation for obtaining a marker at a particular position in a period in which the first operating state continues and second marking timing on a basis of the user's input operation for obtaining a marker at a particular position in a period in which the second operating state continues, a second storage unit that is active in the first operating state and the second operating state;

a first display unit; and a second display unit which is light transmissive and stacked on the first display unit, wherein to execute processing of:

controlling the positional information acquisition unit using the second processor to acquire, in the first operating state, the positional information of the electronic apparatus including the time information, controlling the second storage unit using the second processor to store a time of day measured by the clock circuit at the first marking timing without associating the time of day with the positional information, controlling the positional information acquisition unit using the second processor to acquire, in the second operating state, positional information of the electronic apparatus at the second marking timing, and matching, in the second operating state, the time information included in the positional information of the electronic apparatus acquired by the positional information acquisition unit at the first marking timing against the time of day measured by the clock circuit at the first marking timing stored by the second storage unit in the first operating state, thereby acquiring positional information of the electronic apparatus at the first marking timing, and adding, in the second operating state and using the first processor, a marker on a map displayed on the first display unit on a basis of the positional information of the electronic apparatus at the first marking timing and the second marking timing acquired by the positional information acquisition unit, wherein adding, using the first processor, the marker on the map displayed on the first display unit includes adding markers indicating the first marking timing and the second marking timing without displaying markers other than the markers indicating the first marking timing and the second marking timing.

* * * * *